(12) United States Patent
Elsener et al.

(10) Patent No.: US 6,555,792 B1
(45) Date of Patent: Apr. 29, 2003

(54) THERMOCYCLER AND LIFTING ELEMENT

(75) Inventors: Donat Elsener, Mannedorf (CH); Daniel Ryser, Stafa (CH)

(73) Assignee: Tecan Trading AG, Mannedorf (CH)

( * ) Notice: Subject to any disclaimer, the term of this patent is extended or adjusted under 35 U.S.C. 154(b) by 236 days.

(21) Appl. No.: 09/672,726

(22) Filed: Sep. 28, 2000

(30) Foreign Application Priority Data

Sep. 29, 1999 (CH) .................................. 1782/99

(51) Int. Cl.⁷ .............................. B01L 3/00; B01L 7/00; G01N 1/28
(52) U.S. Cl. ..................... 219/428; 219/385; 219/433; 435/288.4; 435/809
(58) Field of Search ................. 219/385, 386, 219/428, 429, 432, 433; 422/102, 104, 285; 435/288.4, 809

(56) References Cited

U.S. PATENT DOCUMENTS

| | | |
|---|---|---|
| 3,634,651 A | 1/1972 | Siegel et al. ............... 219/400 |
| 4,909,992 A * | 3/1990 | Bjorkman .................. 422/104 |
| 5,030,418 A | 7/1991 | Miyata ........................ 422/63 |
| 5,346,672 A | 9/1994 | Stapleton et al. ........... 422/102 |
| 5,459,300 A * | 10/1995 | Kasman ..................... 219/433 |
| 5,681,492 A * | 10/1997 | Praet ......................... 219/400 |
| 6,406,670 B1 * | 6/2002 | Earley et al. ............... 422/102 |
| 6,423,948 B1 * | 7/2002 | Kwasnoski et al. ......... 219/428 |

FOREIGN PATENT DOCUMENTS

| | | |
|---|---|---|
| DE | 19739119 | 3/1999 |
| EP | 542422 | * 5/1993 |
| EP | 0810030 | 12/1997 |

* cited by examiner

*Primary Examiner*—Joseph Pelham
(74) *Attorney, Agent, or Firm*—Notaro & Michalos P.C.

(57) ABSTRACT

Some of the blind holes (6) between indentations (4) of a heating surface (3) contain lifting elements (7) which, after opening of a cover, release a microtitre plate (13) from the heating surface (3) and raise said microtitre plate about 2 to 3 mm, so that it can be removed without application of force. Each lifting element (7) consists of a coil spring (8) and a contact pin (9) made of, for example, PEEK which is inserted into said coil spring and presses with a round flat abutting surface (12) against the lower surface of the microtitre plate (13). The spring constant of the lifting element (7) is about 6 N/mm.

14 Claims, 3 Drawing Sheets

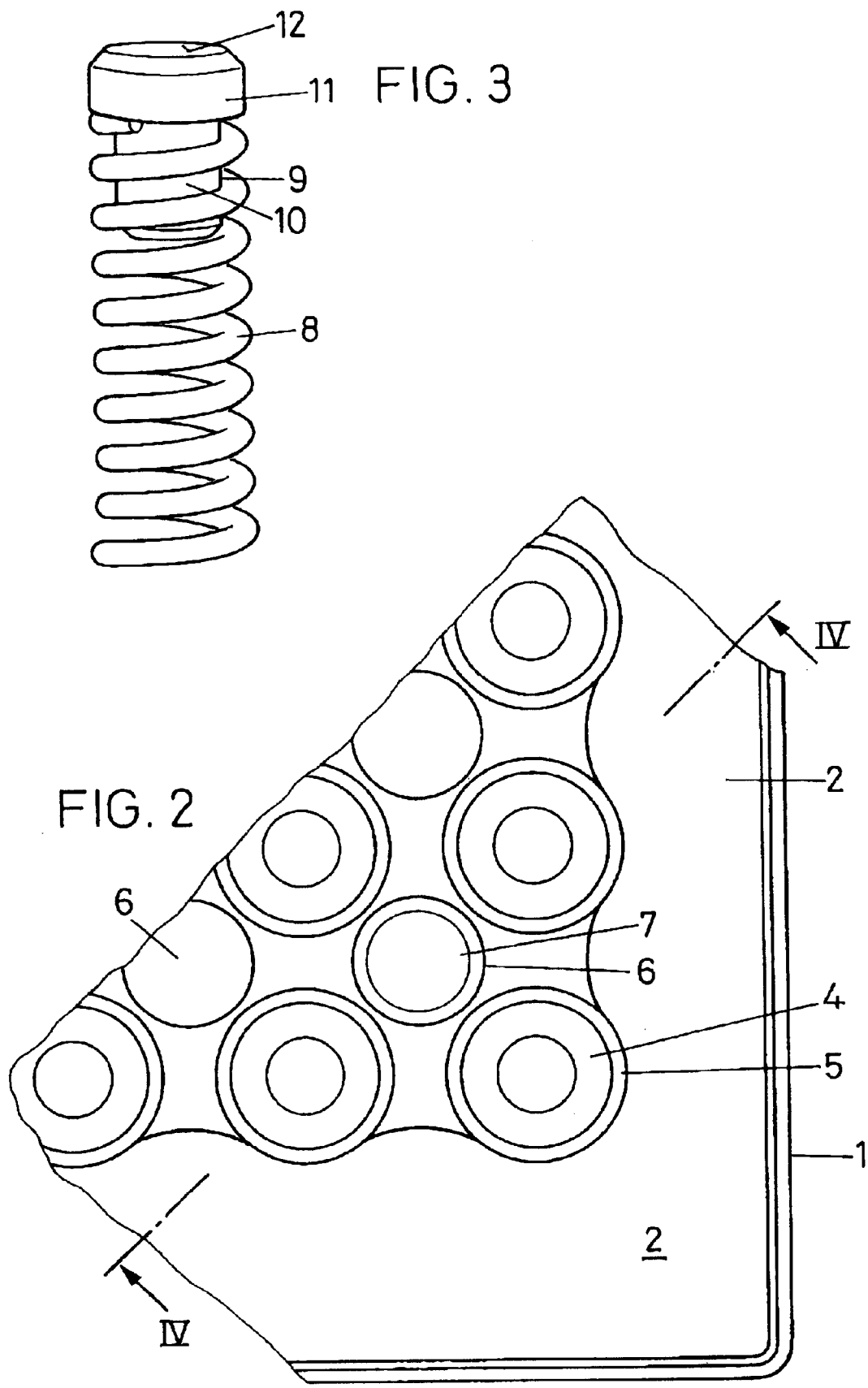

THERMOCYCLER AND LIFTING ELEMENT

FIELD OF THE INVENTION

The invention relates to a thermocycler. Such devices are used for subjecting the content of the wells of microtitre plates to temperature cycles which initiate specific chemical reactions. It also relates to lifting elements for use in thermocyclers.

PRIOR ART

In known thermocyclers of the generic type, there is the problem that the microtitre plate which, in the interests of good heat transfer, rests closely against the heating surface frequently becomes baked onto it and can then be detached from it only with very great difficulty. This either necessitates complicated manipulations or requires suitable and correspondingly heavy and expensive handling devices for applying relatively large forces of 150 N or more. A possible aid is the use of Teflon spray, which can prevent the microtitre plate from baking on. However, this must be repeated for every plate and complicates the procedures.

SUMMARY OF THE INVENTION

It is the object of the invention to improve a known thermocycler of the generic type so that the microtitre plates can be raised and removed after each treatment without particular application of force. This object is achieved by the features in the characterizing clause of claim 1.

It has been found that, as a result of the measures according to the invention, the microtitre plate is raised after removal of the cover, which permits convenient gripping and lifting thereof without application of force. This may substantially facilitate the manual removal of the microtitre plate, but in particular the removal can also be effected without any manual intervention, by means of handling devices of the type otherwise usual in the laboratory.

Furthermore, the invention provides particularly suitable lifting elements for thermocyclers according to the invention.

BRIEF DESCRIPTION OF THE DRAWINGS

The invention is explained in more detail below with reference to Figures which show only an embodiment.

FIG. 2 shows, on a larger scale, a cut-out from a plan view according to FIG. 1, FIG. 3 shows a perspective view of a lifting element according to the invention.

DESCRIPTION OF THE PREFERRED EMBODIMENTS

Figure 1:
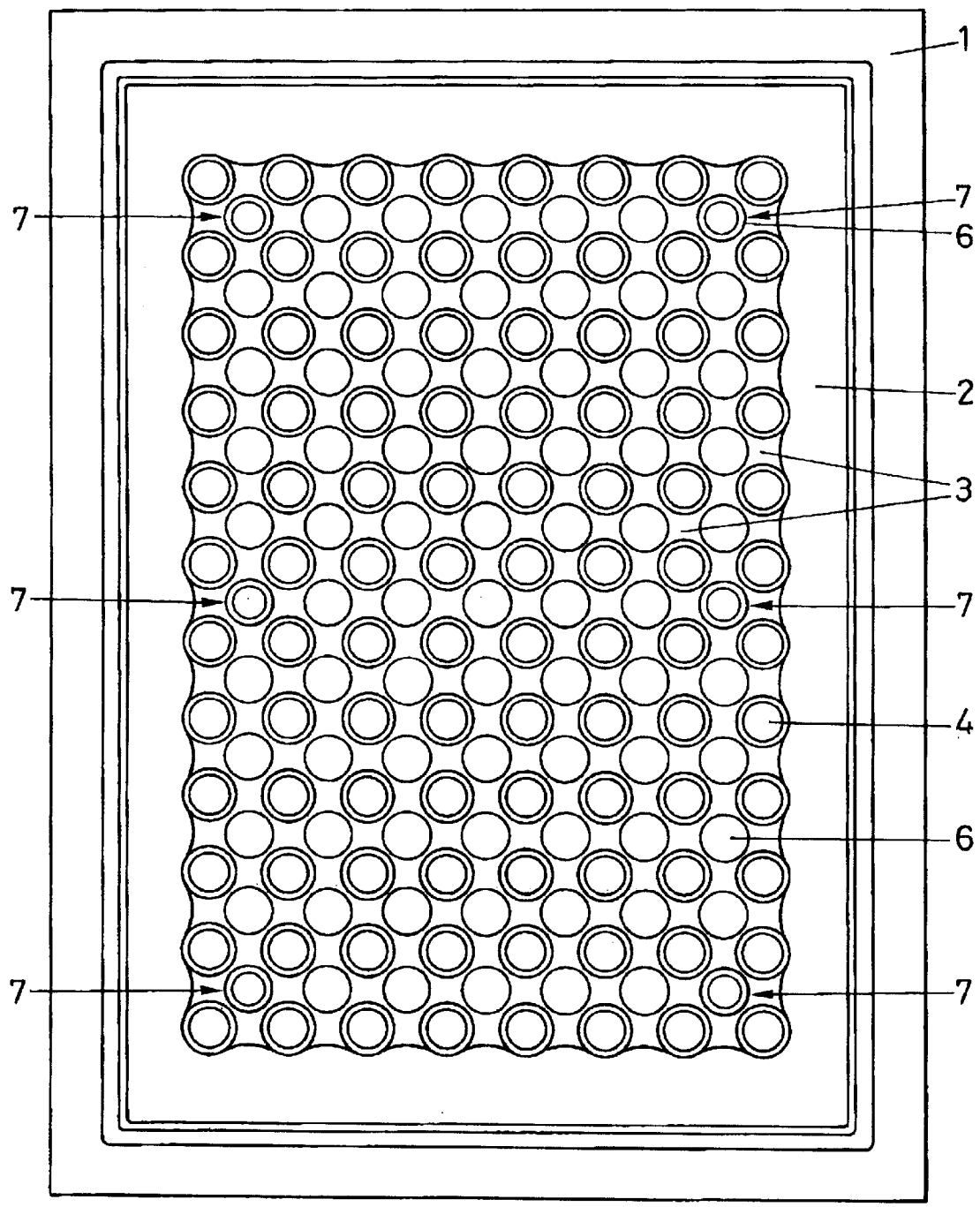
FIG. 1 shows a plan view of the heating plate of a thermocycler according to the invention.

The thermocycler, which may be suitable, for example, for holding an 8×12 microtitre plate having the dimensions 85 mm×130 mm, has a heating plate 1 which forms a heating surface 3 which is surrounded by an edge strip 2 and is somewhat higher than said edge strip and in which round indentations 4 are arranged in a regular square grid, each of which indentations is surrounded by an all-round wall 5 (FIG. 2) projecting beyond the base level of the heating surface 3. In each case, a blind hole 6 is provided between four indentations 4.

Six lifting elements 7 are arranged in six of the blind holes 6 altogether, distributed approximately uniformly over the heating surface 3. Each of the lifting elements 7 consists (FIG. 3) of a cylindrical coil spring 8 of stainless steel, the lowermost winding of which is somewhat wider than the other windings, and a contact pin 9 whose approximately cylindrical shaft 10 is inserted into the upper end of the coil spring 8 and is held therein by friction.

The shaft 10 carries an approximately disc-like head 11 which projects laterally from it and against whose lower surface the upper end of the coil spring 8 abuts, while its upper surface forms a round flat abutting surface 12. The contact pin 9 is rotationally symmetrical and is produced as a single piece from a heat-resistant plastic, such as PEEK, PTFE, FP, PPS or PI, for example by the injection moulding process. It may also consist of, for example, ceramic, but the production is then as a rule more complicated and more expensive. The contact pin 9 is between 3 mm and 8 mm, preferably about 6 mm, long. The diameter of the abutting surface 12 is between 3 mm and 7 mm, preferably about 5 mm.

The lifting element 7 has a length of between 15 mm and 20 mm, preferably of about 16 mm. Its spring constant in the relaxed position is between 5 N/mm and 7.5 N/mm, in particular 6 N/mm. It is of course also possible to choose other dimensions and properties in adaptation to different designs of the heating plate and depending on the density with which the lifting elements 7 are arranged on the heating surface and which is 1 per 18.4 $cm^2$ in the case described above and, as a rule, is at least 1 per 30 $cm^2$.

The coil spring 8 is dimensioned in each case so that the somewhat wider lowermost winding is slightly radially compressed in the blind hole 6 so that there is a frictional lock between said winding and the wall of the blind hole 6. The lifting element 7 is thus adequately fixed but can nevertheless easily be removed. The other windings are free from the wall of the blind hole 6 so that the compression of the coil spring 8 is not hindered.

Figure 4A:
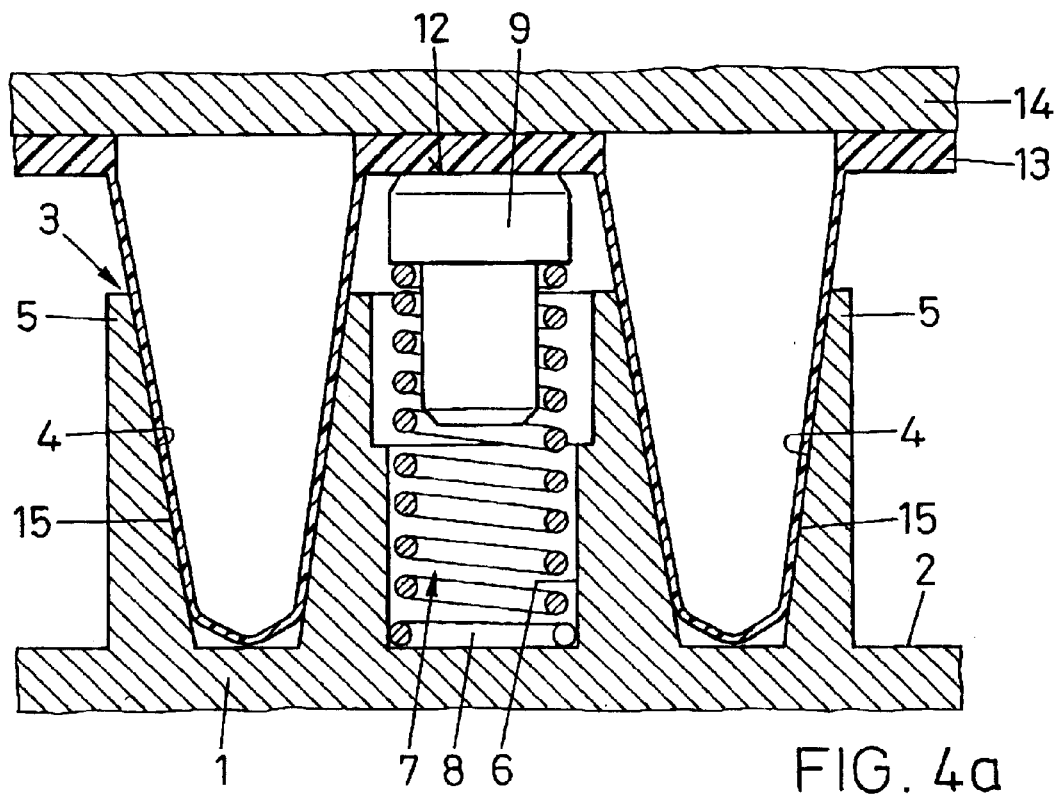
FIG. 4a shows a section along IV—IV in FIG. 2, in addition with microtitre plate and cover.

When the thermocycler is used, the microtitre plate 13, which usually consists of plastic, e.g. polypropylene, is placed on the heating surface 3 (FIGS. 4a, 4b) manually or preferably by means of a suitable handling device, e.g. a robot arm, and a hinged cover 14 of the thermocycler is lowered onto said microtitre plate so that each of its wells is pressed into a corresponding indentation 4 and rests against its wall (FIG. 4a). This ensures good heat transfer between the heating plate 1 and the samples in the wells 15. The coil springs 8 of the lifting elements 7, which, in the relaxed state, project about 6 mm above the edges of the walls 5, are compressed by the pressure exerted by the microtitre plate 13 on the abutting surfaces 12 of its contact pins 9 and are shortened by 2 to 3 mm.

Figure 4B:
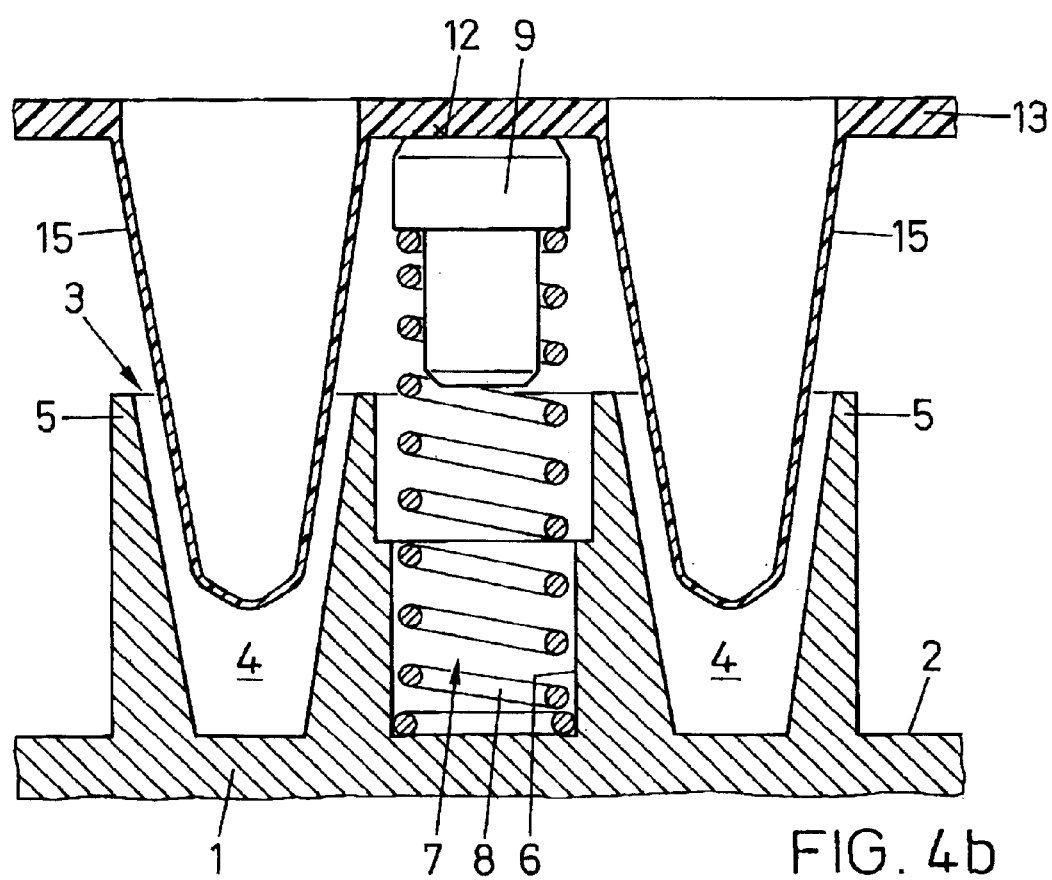
FIG. 4b shows a section corresponding to FIG. 4a with the cover removed.

After the thermal treatment of the samples in the microtitre plate, which, for example to initiate a PCR reaction, may undergo a relatively large number of temperature cycles, each of which may consist of, for example, heating from 4° C. to 96° C. with subsequent cooling to 4° C., the cover 14 is swivelled up again. Each of the compressed lifting elements 7 exerts an upward force of about 15 N on the microtitre plate 13. This is sufficient to detach the microtitre plate 13 from the heating surface 3 even if it is baked onto the latter and to raise it, possibly with a delay of a few seconds (FIG. 4b). The microtitre plate 13 raised in this manner and no longer connected to the heating surface 3 can now be removed easily and without application of great force, which again can be effected by a robot arm.

It has been found that it is generally sufficient if the lifting elements together exert a force of about 0.8 N/cm$^2$, preferably 1 N/cm$^2$, on the microtitre plate. Contact pins made of PEEK have proved suitable in that they are thermally stable and do not bake onto microplates of the conventional materials, such as polypropylene, so that the slight frictional lock is sufficient to hold the lifting elements 7 in the blind holes 6.

Apart from the lifting elements 7, the thermocycler can correspond to a known type, e.g. PTC 225 Tetrad from MJ Research, Inc. It is also possible to retrofit known thermocyclers with lifting elements.

What is claimed is:

1. A thermocycler having a heating plate which forms a heating surface for holding a microtitre plate whose wells are held in indentations provided in the heating surface, and have a cover which can be lowered and raised relative to the heating surface, said cover serving for pressing the microtitre plate against the heating surface, wherein a plurality of elastically compressible lifting elements for rising and detaching of the microtitre plate from the heating surface are distributed over the heating surface, said lifting elements projecting beyond the edges of the indentations at least when the cover is raised.

2. The thermocycler according to claim 1, wherein the projection of the lifting elements is at least 2 mm, preferably at least 5 mm.

3. The thermocycler according to claim 1, wherein the density of the lifting elements is at least 1 per 30 cm$^2$.

4. The thermocycler according to claim 1, wherein each lifting element is removably fixed to the heating surface.

5. The thermocycler according to claim 1, wherein each lifting element is inserted into a blind hole in the heating surface.

6. The thermocycler according to claim 4, wherein the fixing of the lifting element is effected by frictional locking with the walls of the blind hole.

7. The thermocycler according to claim 1, wherein the lifting element comprises an elongated spring element which is compressible in the longitudinal direction and carries a contact part which forms an abutting surface, oriented transversely to the longitudinal direction, at the upper end of the lifting element.

8. The thermocycler according to claim 7, wherein the contact part consists of plastic, preferably PEEK, PTFE, FP, PPS or PI.

9. The thermocycler according to claim 7, wherein the spring element is in the form of a coil spring and the contact part is in the form of a contact pin which comprises a shaft surrounded by the upper part of the coil spring and a laterally projecting head which rests on the upper end of the coil spring and whose upper surface forms the abutting surface.

10. The thermocycler according to claim 9, wherein the lowermost winding of the coil spring is somewhat wider.

11. The thermocycler according to claim 9, wherein the contact pin is rotationally symmetrical.

12. The thermocycler according to claim 11, wherein both the shaft and the head of the contact pin are essentially cylindrical.

13. The thermocycler according to claim 7, wherein the length of the lifting element is between 15 mm and 20 mm and the diameter of the abutting surface is at least 3 mm.

14. The thermocycler according to claim 7, wherein the spring constant of the lifting element is at least 5 N/mm.

\* \* \* \* \*